(12) United States Patent
Hiroshima et al.

(10) Patent No.: US 9,538,722 B2
(45) Date of Patent: Jan. 10, 2017

(54) ANIMAL LITTER

(71) Applicant: UNICHARM CORPORATION, Ehime (JP)

(72) Inventors: Kenji Hiroshima, Kagawa (JP); Tomoko Hirao, Kagawa (JP); Shinya Kaneko, Kagawa (JP); Hidekazu Yamada, Shizuoka (JP); Takahiro Otomo, Shizuoka (JP)

(73) Assignee: Unicharm Corporation, Ehime (JP)

( * ) Notice: Subject to any disclaimer, the term of this patent is extended or adjusted under 35 U.S.C. 154(b) by 50 days.

(21) Appl. No.: 14/404,142

(22) PCT Filed: Apr. 26, 2013

(86) PCT No.: PCT/JP2013/062495
§ 371 (c)(1),
(2) Date: Nov. 26, 2014

(87) PCT Pub. No.: WO2013/179843
PCT Pub. Date: Dec. 5, 2013

(65) Prior Publication Data
US 2015/0107524 A1  Apr. 23, 2015

(30) Foreign Application Priority Data

May 31, 2012 (JP) ................. 2012-125324

(51) Int. Cl.
*A01K 1/01* (2006.01)
*A01K 1/015* (2006.01)

(52) U.S. Cl.
CPC .......... *A01K 1/0152* (2013.01); *A01K 1/0154* (2013.01); *A01K 1/0155* (2013.01)

(58) Field of Classification Search
None
See application file for complete search history.

(56) References Cited

U.S. PATENT DOCUMENTS

| 5,743,213 | A | 4/1998 | Fujiura | |
|---|---|---|---|---|
| 6,568,349 | B1* | 5/2003 | Hughes | A01K 1/0155 119/171 |
| 7,958,847 | B2* | 6/2011 | Greene | A01K 1/0154 119/171 |
| 8,733,288 | B2* | 5/2014 | Winkleman | A01K 1/0152 119/173 |
| 9,283,540 | B2* | 3/2016 | Fritter | B01J 20/2803 |
| 2005/0005870 | A1* | 1/2005 | Fritter | A01K 1/0152 119/173 |
| 2006/0243212 | A1* | 11/2006 | Jenkins | A01K 1/0154 119/171 |
| 2007/0289543 | A1* | 12/2007 | Petska | A01K 1/0154 119/173 |
| 2010/0006035 | A1* | 1/2010 | Spittle | A01K 1/0152 119/172 |
| 2015/0181834 | A1* | 7/2015 | Lipscomb | A01K 1/0155 119/171 |
| 2015/0196005 | A1* | 7/2015 | Lipscomb | A01K 1/0152 119/171 |

FOREIGN PATENT DOCUMENTS

| JP | 4-335841 | 11/1992 |
|---|---|---|
| JP | 2009-87 A | 1/2009 |
| JP | 2009-273417 A | 11/2009 |
| JP | 2010-247013 A | 11/2010 |

OTHER PUBLICATIONS

International Search Report from corresponding PCT application No. PCT/JP2013/062495 dated Jul. 23, 2013 (2 pgs).

* cited by examiner

*Primary Examiner* — Joshua Rodden
(74) *Attorney, Agent, or Firm* — Brinks Gilson & Lione

(57) ABSTRACT

Provided is an animal litter that is less liable to scatter and in which the depth of the solids is less liable to increase when a liquid such as urine has been absorbed. An animal litter composed of a plurality of particulates having water absorbency, wherein the particulates contain: long grains having a granularity of 4 mm or more and less than 10 mm, and a length that is greater than the diameter; and short grains having a granularity of 4 mm or more and less than 10 mm, and a length that is no more than the diameter. The long grains are provided with a core part primarily composed of pulp, and a coating layer containing highly water-absorbent resin and used for coating the core part. The weight ratio of the short grains in total of the long grains and the short grains is 10%-50%, inclusive.

5 Claims, No Drawings

ANIMAL LITTER

RELATED APPLICATION

This application is a 35 U.S.C. §371 national phase filing of International Patent Application No. PCT/JP2013/062495 filed Apr. 26, 2013, to which priority is claimed under 35 U.S.C. §120 and through which priority is claimed under 35 U.S.C. §119 to Japanese Patent Application No. 2012-125324, filed May 31, 2012, the complete disclosure of which is hereby expressly incorporated by reference.

TECHNICAL FIELD

The present invention relates to animal litter. More specifically, the present invention relates to animal litter for absorbing and solidifying liquid such as urine, being provided with a core portion that is composed mainly of pulp and a covering portion that is configured to include a highly absorbent resin and to cover the core portion.

BACKGROUND ART

Conventionally, a toilet for animals such as dogs and cats kept as pets is provided with a box-like container for toilet with an open upper part and animal litter contained in the container for toilet. In addition, a technique has been proposed in which animal litter is formed from particulates provided with a core portion which is composed mainly of pulp and a covering portion which is configured to include a highly absorbent resin and to cover the core portion (for example, refer to Patent Document 1).

By employing such particulates provided with the core portion and the covering portion as animal litter, when excreted urine is absorbed by the particulates, the highly absorbent resin constituting the covering portion swells and sticks to adjacent particulates, to thereby form an aggregate. As a result, an owner of a pet can easily remove dirty particulates contaminated with urine by removing the aggregate of the particulates, and can maintain the animal litter in a preferred sanitary state.

Patent Document 1: Japanese Unexamined Patent Application Publication No. 4-335841

DISCLOSURE OF THE INVENTION

Problems to be Solved by the Invention

The container for toilet is lined with animal litter approximately 5 cm in depth, for example, in order to allow sufficient absorption of the pet's excretion.

Here, the particulates composed mainly of pulp are relatively lighter and more easily scattered than particulates composed mainly of a mineral such as bentonite. Given this, in a case of configuring the animal litter with the particulates composed mainly of pulp, it is preferable to increase grain size in order to prevent scattering.

However, in a case in which the grain size of the particulates is increased, excreted urine soaks down too much due to a larger gap generated between the particulates, and the aggregate of the particulates is elongated in the direction of depth. In addition, if excreted urine reaches the bottom face of the container for toilet without being absorbed by the particulates, the aggregate is formed in a state in which the urine spreads in a planar direction at the bottom face of the container for toilet. The aggregate of the particulates in elongated form and the aggregate of the particulates formed to spread out in a planar direction in the vicinity of the bottom face of the container for toilet are difficult to remove. In addition, if excreted urine reaches the bottom face of the container for toilet without being absorbed by the particulates, the container for toilet is contaminated.

Meanwhile, in a case in which the grain size of the particulates constituting the animal litter is reduced, urine can be prevented from soaking too much downwards and the aggregate formed can be made shallow. However, in this case, the particulates are easily scattered when the container for toilet is lined with the animal litter and when a pet agitates the animal litter with its back paws. Furthermore, the particulates which are small in grain size easily stick between paw pads and scatter around the container for toilet.

Given this, the present invention is aimed at providing animal litter that can prevent an aggregate from growing depth-wise upon absorption of liquid such as urine, and can suppress scattering.

Means for Solving the Problems

The present invention relates to an animal litter composed of a plurality of particulates having a water absorbing property. The particulates include long particles of at least 4 mm and less than 10 mm in grain size that have length greater than diameter, and short particles of at least 4 mm and less than 10 mm in grain size that have length no greater than diameter. The long particles are provided with a core portion which is composed mainly of pulp and a covering layer which is configured to include a highly absorbent resin and to cover the core portion. Proportion of the short particles to total of the long particles and the short particles is at least 10% and no greater than 50% in ratio by weight.

It is preferable that the short particles are provided with a core portion which is composed mainly of pulp and a covering layer which is configured to include a highly absorbent resin and to cover the core portion; and ratio by weight of the highly absorbent resin included in the long particles is lower than ratio by weight of the highly absorbent resin included in the short particles.

It is preferable that the short particles are composed mainly of pulp without including a highly absorbent resin.

It is preferable that proportion of the short particles and the long particles to the animal litter is at least 90% by ratio by weight.

It is preferable that the particulates include a fragrance.

Effects of the Invention

According to the animal litter of the present invention, an aggregate can be prevented from growing depth-wise upon absorption of liquid such as urine, and scattering can be suppressed.

PREFERRED MODE FOR CARRYING OUT THE INVENTION

A preferred embodiment of the animal litter of the present invention is described hereinafter.

The animal litter of the present invention is constituted of a plurality of particulates composed mainly of pulp and having a water absorbing property.

In the present invention, the plurality of particulates includes long particles and short particles.

In the present specification, a long particle indicates a particulate of at least 4 mm and less than 10 mm in grain size, with length greater than diameter. In addition, the short particle indicates a particulate of at least 4 mm and less than 10 mm in grain size, with length no greater than diameter.

In the present specification, particulates that pass through a sieve of 10 mm mesh and do not pass through a sieve of 4 mm mesh are regarded as particulates of at least 4 mm and less than 10 mm in grain size.

The long particles and the short particles are each provided with a core portion and a covering layer.

The core portion is composed mainly of powdery or short fibrous pulp, and is formed by granulating the powdery or short fibrous pulp by an extrusion granulator or the like.

The core portion may include other materials in addition to the pulp. The other materials, for example, may be a highly absorbent resin, a fragrance, an antimicrobial agent, or the like.

Alcohols such as geraniol, citronellol, citral, eugenol, phenethyl alcohol, thymol, linalool, leaf alcohol, menthol, benzyl alcohol and the like, and aldehydes such as hexylcinnamaldehyde and the like, are preferably used as the fragrance. By employing these fragrances, the odor of excreted urine and feces can be suppressed.

As the antimicrobial agent, organic, inorganic metal, photocatalytic, and natural antimicrobial agents can be used; however, an organic surfactant type antimicrobial agent can preferably be used. By employing these antimicrobial agents, propagation of bacteria and the like can be suppressed.

The content of the other materials in the core portion is preferably no greater than 30%, and more preferably no greater than 20%, from the viewpoint of maintaining a preferable water absorbing property.

The covering layer is configured to include a highly absorbent resin. More specifically, the covering layer is preferably configured to include a highly absorbent resin, powdery pulp, and other materials. The covering layer is formed by sprinkling powder, which is a mixture of the highly absorbent resin, the pulp, and the other materials, onto the core portion that contains moisture and has a wet surface.

The other materials constituting the covering layer, for example, may include starch, a fragrance, an antimicrobial agent, and the like.

As the highly absorbent resin, a resin such as polyacrylic acid polymer, starch-acrylic acid polymer and the like can be used.

As the starch, tapioca starch, corn starch and the like can be used. The starch improves stickiness of the particulates when urine is absorbed.

The same fragrances and antimicrobial agents as those used in the core portion can be used.

The content of the highly absorbent resin in the covering layer is preferably 1% to 20%, and more preferably 4% to 15% from the viewpoint of allowing the particulates to exhibit a solidifying property upon absorption of urine and prevent inhibition of a water absorbing property of the core portion by swelling and gelation of the highly absorbent resin.

In the present invention, the proportion of the short particles to the total of the long particles and the short particles is in the range of at least 10% and no greater than 50%, more preferably in the range of at least 10% and no greater than 35%, and yet more preferably in the range of at least 10% and no greater than 15% in ratio by weight. As a result, the short particles are adequately arranged in gaps formed between the long particles, and urine excreted on the surface of the animal litter soaks downwards while adequately diffusing in a planar direction. Thus it is possible to have a shallow aggregate of the plural particulates formed by the core portions of the long particles and the short particles absorbing urine, and the highly absorbent resin, included in the covering layer of the long particles and the short particles, swelling and becoming sticky.

In addition, since the aggregate is formed in a state in which the short particles are arranged between the long particles, the surface of the aggregate thus formed becomes smooth. Here, since the aggregate is to be removed by a scoop, such a smooth surface of the aggregate can prevent the surface of the aggregate from breaking or stripping away.

In addition, by making the proportion of the short particles to the total of the long particles and the short particles no greater than 50%, scattering of the animal litter can be suppressed.

Furthermore, in the animal litter, the proportion of the long particles and the short particles with respect to all the particulates is preferably at least 90% and more preferably at least 95% in ratio by weight. By making the proportion of the long particles and the short particles to all the particulates at least 90%, the gaps formed between the particulates constituting the animal litter can be prevented from becoming too large and the aggregate can be prevented from growing depth-wise. In addition, scattering due to the presence of particulates smaller in grain size than the short particles can be prevented.

It should be noted that particulates other than the long particles and the short particles may be particulates in which the long particles or the short particles are broken, and particulates of large grain size formed as a result of bonding of plural particulates during granulation.

In addition, it is preferable that the ratio by weight of the highly absorbent resin included in the long particles is lower than the ratio by weight of the highly absorbent resin included in the short particles. By making the content of the highly absorbent resin in the long particles lower than the content of the highly absorbent resin in the short particles, the water absorbing property of the core portion of the long particle can be relatively improved. Furthermore, by increasing the content of the highly absorbent resin in the short particles, stickiness of the covering layer of the short particles can be improved and deterioration of a solidifying property of the animal litter can be prevented.

Alternatively, the short particle can be composed mainly of pulp without including the highly absorbent resin. In this case, by forming the short particle without including the highly absorbent resin, the water absorbing property of the short particle can be improved.

In addition, the animal litter can include particulates composed mainly of other material in addition to the particulates composed mainly of pulp. The other material may be a porous material such as activated charcoal, silica gel, zeolite and the like having a deodorant effect and/or a moisture adjusting effect, as well as citric acid, sodium bicarbonate, a surfactant and the like having a neutralizing effect. The particulates can be configured by including a bactericide, an antibacterial agent, a bacteriostatic agent, and a fragrance in the other material.

The content of the particulates composed mainly of the other material in the animal litter is preferably no greater than 10% and no greater than 5% in ratio by weight.

Furthermore, in the present invention, it is preferable that the long particles and the short particles are formed in cylindrical shapes having diameters which are substantially equal to each other. By configuring the long particles and the short particles in cylindrical shapes having diameters which are substantially equal, adequate gaps are formed between the long particles, and the short particles can be preferably arranged in the gaps. The depth of the aggregate formed when urine is excreted can thus be stabilized.

EXAMPLES

The present invention is described in further detail hereinafter with reference to Examples. However, the scope of the present invention is not limited to the examples.

Manufacture of Particulate Matter

Raw material, composed mainly of pulp and including a highly absorbent resin and extracted from waste material in the manufacture of disposable diapers, was pulverized to have a grain size of φ5 mm to φ15 mm and water was added thereto such that granulation moisture percentage was 10% to 40%.

After mixing, the mixture was granulated by using an extrusion granulator. Here, the mixture pushed through a screen was cut at intervals of 8 mm, thereby obtaining a core portion of an envisioned long particle; and the mixture pushed through the screen was cut at intervals of 4 mm, thereby obtaining a core portion of an envisioned short particles.

The covering layer was formed by sprinkling powder, which is a mixture of 55% to 90% of the pulverized pulp, 5% to 40% of the highly absorbent resin, and 5% to 40% of starch, onto the surface of the core portion of the envisioned long particle and the core portion of the envisioned short particle thus obtained, thereby obtaining particulates of the envisioned long particles and the envisioned short particles. Next, the particulates of the envisioned long particle and the envisioned short particle thus obtained were dried by a drier such that moisture percentage is no greater than 10%.

Thereafter, the particulates of the envisioned long particles and the envisioned short particles thus obtained were sifted through a sieve of 4 mm mesh and particulates having passed the sieve of 4 mm mesh were removed. Furthermore, the particles remaining in the sieve of 4 mm mesh were divided in a uniform way by a sample divider (manufactured by TSUTSUI SCIENTIFIC INSTRUMENTS CO., LTD.), after which diameters and lengths of the particulates were measured by slide calipers.

The diameters and lengths of the particulates of the envisioned long particles and the envisioned short particles thus obtained are shown in Table 1 below.

It should be noted that, since the diameters and lengths of granulated particulates generally vary, respective values obtained by rounding, to one decimal place, averages of diameters and lengths of particulates of the envisioned long particles and the envisioned short particles (N=50) used in measurement are considered as the diameters and lengths of the particulates of the envisioned long particles and the envisioned short particles.

TABLE 1

|  | Diameter (N = 50) | | | Length (N = 50) | | |
| --- | --- | --- | --- | --- | --- | --- |
|  | Average | Minimum | Maximum | Average | Minimum | Maximum |
| Envisioned long particle | 4.7 mm | 4.5 mm | 4.9 mm | 7.2 mm | 2.5 mm | 9.7 mm |
| Envisioned short particle | 4.8 mm | 4.5 mm | 4.9 mm | 3.7 mm | 2.0 mm | 5.1 mm |

The long particles and the short particles thus obtained were mixed in the proportions shown in Table 2 below, to thereby obtain the animal litter of Examples 1 to 8 and Comparative Examples 1 to 4. The mixture ratio of the long particles and the short particles was measured by: arbitrarily mixing particulates of the envisioned long particles and the envisioned short particles, making sample divisions by the above described sample divider, sifting through a sieve of 4 mm mesh, measuring lengths of the particulates remaining on the sieve, and calculating the mixture ratio of the long particles and the short particles.

TABLE 2

|  | Long particle % | Short particle % | Short particle mixture ratio % |
| --- | --- | --- | --- |
| Comparative Example 1 | 100 | 0 | 0 |
| Comparative Example 2 | 95 | 5 | 5 |
| Example 1 | 90 | 10 | 10 |
| Example 2 | 85 | 15 | 15 |
| Example 3 | 75 | 25 | 25 |
| Example 4 | 70 | 30 | 30 |
| Example 5 | 65 | 35 | 35 |
| Example 6 | 60 | 40 | 40 |
| Example 7 | 55 | 45 | 45 |
| Example 8 | 50 | 50 | 50 |
| Comparative Example 3 | 45 | 55 | 55 |
| Comparative Example 4 | 40 | 60 | 60 |

Solidification depth and strip-away rate were measured and scattering was determined for the animal litter of Examples 1 to 8 and Comparative Examples 1 to 4. The results are shown in Table 3 below.

Measurement of Solidification Depth

The animal litter of Examples 1 to 8 and Comparative Examples 1 to 4 are each contained in beakers to a depth of at least 10 cm.

Next, 20 ml of a normal saline solution (0.9% NaCl aq) at 22° C. is added as artificial urine in drops for 10 seconds to the beakers with the animal litter, from a position of 3 cm above the upper surface of the animal litter.

10 minutes after addition of the artificial urine, the depth of an aggregate obtained was measured. The depth of the aggregate was evaluated as follows: a double circle is shown for a case of less than 50 mm; a circle for a case of at least 50 mm and less than 70 mm; and an x for a case of at least 70 mm.

Measurement of Strip-Away Rate

The aggregate obtained in the above described measurement of solidification depth was taken by a scoop, agitated laterally for 10 seconds, and the stripped-away particulates were weighed. The strip-away rate was obtained by dividing the weight of the stripped-away particulates by the weight of the aggregate before agitation. The strip-away rate was evaluated as follows: a double circle is shown for a case of less than 5%; a circle for a case of at least 5% and less than 10%; and an x for a case of at least 10%.

Evaluation of Scattering 10 g of each of the animal litter of Examples 1 to 6 and Comparative Examples 1 to 4 was freely dropped onto a flat plate from a height of 50 cm, and the state of the scattered animal litter was visually evaluated.

The evaluation was made by 10 cat owners, and the state of the scattered animal litter was evaluated as follows: a double circle is shown for a case in which 8 to 10 cat owners can tolerate the state; a circle for a case in which 4 to 7 cat owners can tolerate the state; and an x for a case in which 0 to 3 cat owners can tolerate the state.

TABLE 3

|  | Solidification depth | | Strip-away rate | | Scattering | |
| --- | --- | --- | --- | --- | --- | --- |
|  | Evaluation | mm | Evaluation | % | Evaluation | Number of people |
| Comparative Example 1 | ○ | 56.1 | X | 11.2 | ◎ | 9 |
| Comparative Example 2 | ○ | 51.2 | X | 10.7 | ◎ | 9 |
| Example 1 | ◎ | 42.1 | ○ | 7.3 | ◎ | 8 |
| Example 2 | ◎ | 40.2 | ○ | 6.3 | ◎ | 8 |
| Example 3 | ◎ | 40.0 | ◎ | 4.9 | ○ | 6 |
| Example 4 | ◎ | 41.8 | ○ | 6.6 | ○ | 6 |
| Example 5 | ◎ | 40.4 | ○ | 5.5 | ○ | 6 |
| Example 6 | ◎ | 40.0 | ◎ | 4.4 | ○ | 4 |
| Example 7 | ◎ | 39.9 | ◎ | 4.5 | ○ | 4 |
| Example 8 | ◎ | 42.0 | ◎ | 4.2 | ○ | 4 |
| Comparative Example 3 | ◎ | 39.8 | ◎ | 4.4 | X | 2 |
| Comparative Example 4 | ◎ | 39.1 | ◎ | 4.1 | X | 2 |

As shown in Table 3, for the animal litter of Examples 1 to 8 and Comparative Examples 3 and 4 with the proportion of the short particles to the total of the long particles and the short particles being at least 10% in ratio by weight, the solidification depths were less than 50 mm and it is indicated that the aggregations generated upon absorption of urine do not grow depth-wise. On the other hand, for the animal litter of Comparative Examples 1 and 2, the solidification depths were at least 50 mm and it is indicated that the aggregations grow depth-wise.

In addition, for the animal litter of Examples 1 to 8 and Comparative Examples 3 and 4, the strip-way rates were less than 10% and it is indicated that the particulates do not easily strip away upon taking up the aggregate with a scoop. On the other hand, for the animal litter of Comparative Examples 1 and 2, the strip-away rates were at least 10% and it is indicated that the particulates easily fall off.

Furthermore, for Examples 1 to 8 and Comparative Examples 1 and 2, a large number of cat owners could tolerate the scattering of the animal litter and it is indicated that the evaluation is preferable. Furthermore, for Comparative Examples 3 and 4, a large number of cat owners evaluated the scattering of the animal litter as not being tolerable, and it is indicated that the evaluation is poor.

Given the above results, for the animal litter of Examples 1 to 8 with the proportion of the short particles to the total of the long particles and the short particles being in the range of at least 10% and no greater than 50% in ratio by weight, it is indicated that the aggregations generated upon absorption of urine are less likely to grow depth-wise and that scattering is less likely to occur. Among these, for the animal litter of Examples 1 to 5 with the proportion of the short particles to the total of the long particles and the short particles being in the range of at least 10% and no greater than 35% in ratio by weight, the evaluation regarding scattering has been further improved. Furthermore, for the animal litter of Examples 1 and 2 with the proportion of the short particles to the total of the long particles and the short particles being in the range of at least 10% and no greater than 20% in ratio by weight, it is indicated that both the evaluation of solidification depth and the evaluation of scattering are particularly good.

The invention claimed is:

1. An animal litter composed of plurality of particulates having a water absorbing property,
    wherein the particulates include long particles and short particles, that have substantially same diameters, respectively,
    the long particles are at least 4 mm and less than 10 mm in grain size and each of the long particles has a length that is greater than a diameter thereof, and
    the short particles are at least 4 mm and les than 10 mm in grain size and each of the short particles has a length that is no greater than a diemeter thereof;
    the long particles are provided with a core portion which is composed mainly of pulp and a covering layer which includes a highly absorbent resin and covers the core portion;
    the short particles are provided with a core portion which is composed mainly of pulp and a covering layer which includes a highly absorbent resin and covers the core portion; and
    a proportion of the short particles to a total of the long particles and the short particles is at least 10% and no greater than 50% in ratio by weight.

2. The animal litter according to claim 1, wherein a ratio by weight of the highly absorbent resin included in the long particles is lower than a ratio by weight of the highly absorbent resin included in the short particles.

3. The animal litter according to claim 1, wherein proportion of the short particles and the long particles to the animal litter is at least 90% by ratio by weight.

4. The animal litter according to claim 1, wherein the particulates include a fragrance.

5. An animal litter composed of a plurality of particulates having a water absorbing property,
    wherein the particulates include long particles and short particles, having substantially same diameters, respectively,
    the long particle are at least 4 mm and less than 10 mm in grain size and each long particle has a length greater than a diameter thereof, and
    the short particles are at least 4 mm and less then 10 mm in grain size and each short particle has a length no greater than a diameter thereof;
    the long particles are provided with a core portion which is composed mainly of pulp and a covering layer which includes a highly absorbent resin and covers the core portion;
    the short particles are composed mainly of pulp without including a highly absorbent resin; and
    a portion of the short particles to a total of the long particles and the short particles is at least 10% and no greater than 50% in ratio by weight.

* * * * *